United States Patent
Alshech et al.

(10) Patent No.: US 11,651,072 B2
(45) Date of Patent: May 16, 2023

(54) SYSTEM, METHOD AND COMPUTER READABLE MEDIUM FOR IDENTIFYING MISSING ORGANIZATIONAL SECURITY DETECTION SYSTEM RULES

(71) Applicant: CYBERPROOF ISRAEL LTD., Tel Aviv (IL)

(72) Inventors: Eran Alshech, Gedera (IL); Adam Amram, Holon (IL)

(73) Assignee: CyberProof Israel Ltd., Tel Aviv (IL)

( * ) Notice: Subject to any disclaimer, the term of this patent is extended or adjusted under 35 U.S.C. 154(b) by 0 days.

(21) Appl. No.: 17/182,278

(22) Filed: Feb. 23, 2021

(65) Prior Publication Data

US 2021/0273970 A1 Sep. 2, 2021

Related U.S. Application Data

(60) Provisional application No. 62/983,678, filed on Mar. 1, 2020.

(51) Int. Cl.
*G06F 21/55* (2013.01)
*G06N 3/04* (2023.01)
(Continued)

(52) U.S. Cl.
CPC ............ *G06F 21/552* (2013.01); *G06F 18/22* (2023.01); *G06N 3/04* (2013.01); *H04L 63/1433* (2013.01); *H04L 63/1441* (2013.01); *H04L 63/20* (2013.01)

(58) Field of Classification Search
CPC .. H04L 63/1433; H04L 63/1441; H04L 63/20
(Continued)

(56) References Cited

U.S. PATENT DOCUMENTS

| 2012/0180104 A1 | 7/2012 | Gronich et al. |
| 2014/0143878 A1 | 5/2014 | Milman et al. |

(Continued)

FOREIGN PATENT DOCUMENTS

EP 1308823 A2 5/2005

OTHER PUBLICATIONS

Erwan Godefroy et al. Automatic Generation of Correlation Rules to Detect Complex Attack Scenarios, In 2014 10th International Conference on Information Assurance and Security (pp. 23-28).

(Continued)

*Primary Examiner* — Teshome Hailu

(57) ABSTRACT

A system for identifying missing organizational security detection system rules, the system includes at least one processing circuitry configured to provide a known cyber-attack techniques repository including information of known cyber-attack techniques and required SIEM (or any other organizational security detection system such as EDR, firewall, etc.) rules required for protecting against each of the known cyber-attack techniques, the known rules being in a generic SIEM rules format; obtain existing SIEM rules of a SIEM of an organization, the existing SIEM rules being in a vendor-specific language, other than the generic SIEM rules format; translate the existing SIEM rules to the generic SIEM rules format, using a translation system, giving rise to translated SIEM rules; compare the translated SIEM rules to the required SIEM rules to identify missing rules, being the required SIEM rules not included in the translated SIEM rules.

13 Claims, 2 Drawing Sheets

(51) Int. Cl.
*H04L 9/40* (2022.01)
*G06F 18/22* (2023.01)

(58) Field of Classification Search
USPC .......................................................... 726/25
See application file for complete search history.

(56) References Cited

U.S. PATENT DOCUMENTS

| | | |
|---|---|---|
| 2016/0156642 A1* | 6/2016 | Kouznetsov ........ G06F 16/1734 |
| | | 726/23 |
| 2016/0156664 A1 | 6/2016 | Nagaratnam et al. |
| 2017/0237752 A1 | 8/2017 | Ganguly et al. |
| 2018/0041536 A1* | 2/2018 | Berlin ...................... G06N 3/08 |
| 2018/0103067 A1 | 4/2018 | Nagaratnam et al. |
| 2018/0234457 A1 | 8/2018 | Rajkumar |
| 2019/0065755 A1* | 2/2019 | Hatsutori ................ H04L 63/14 |
| 2020/0186569 A1* | 6/2020 | Milazzo ................. H04L 63/08 |
| 2020/0272741 A1* | 8/2020 | Bhatia ................... G06F 40/284 |

OTHER PUBLICATIONS

Muhammad Masoom Alam et al, A High-Level Domain-Specific Language for SIEM (Design, Development and Formal Verification). Cluster Computing, 20(3), Sep. 2017, pp. 2423-2437.

Gustavo Gonzalez Granadillo et al, An Ontology-Driven Approach to Model SIEM Information and Operations Using the SWRL Formalism. International Journal of Electronic Security and Digital Forensics, 4(2/3), 2012, pp. 104-123.

* cited by examiner

SYSTEM, METHOD AND COMPUTER READABLE MEDIUM FOR IDENTIFYING MISSING ORGANIZATIONAL SECURITY DETECTION SYSTEM RULES

TECHNICAL FIELD

The invention relates to a system, method and computer readable medium for identifying missing organizational security detection system rules.

BACKGROUND

Part of living in the digital era is understanding the importance of cybersecurity as everyone and everything is connected. Information flows freely across various devices, services, networks and platforms, giving raise to exposure of sensitive data, personally identifiable information (PII), protected health information (PHI), personal information, intellectual property, data, and governmental and industry information systems, to criminals and adversaries.

Security Information and Event Management (SIEM) tool encompasses various methods and techniques to assist an organization in protecting its data and identifying and/or preventing cyber-attacks and breaches. It combines Security Event Management (SEM), which analyzes log and event data in real time, with Security Information Management (SIM), which collects, analyzes and reports on log data, aggregated from various appliances in organization's network.

Many vendors (e.g. RSA NetWitness, IBM QRadar, Splunk Enterprise Security, etc.) offer SIEM systems, while each vendor provides a language in which users can define various correlation rules aimed at surfacing a broad range of abnormal behavior and events, which may suggest security weaknesses or a possible cyber-attack attempt. Accordingly, a given SIEM correlation rule will be defined in a first manner for a SIEM system provided by a first vendor, and in another manner for a SIEM system provided by a second vendor, as the correlation rules are vendor-specific.

There are many disadvantages of the known SIEM tools, one of which is the absence of a security gap analysis, which enables revealing cyber-attacks and breaches that are not covered by the vendor-specific correlation rules, and optionally consequently generating new corresponding vendor-specific correlation rules to complete the security gap. It is to be noted that this disadvantage also exists in other organizational security detection systems, such as Endpoint Detection and Response (EDR) systems or firewalls.

Therefore, there is a growing need for a new system and method for identifying missing organizational security detection system rules.

References considered to be relevant as background to the presently disclosed subject matter are listed below. Acknowledgement of the references herein is not to be inferred as meaning that these are in any way relevant to the patentability of the presently disclosed subject matter.

US Patent application No. US2012/0180104 published on Jul. 12, 2012 discloses a method of automated generation of a security rule-set and a system thereof. The method comprises: obtaining a group of log records of communication events resulting from traffic related to the security gateway; generating a preliminary rule-set of permissive rules, said set covering the obtained group of log records; generating, with the help of mapping the generated preliminary rule-set to the obtained group of log records, a rule-set of non-overlapping rules covering the group of log records; and generating an operational rule-set by processing the generated rule-set of non-overlapping rules, said processing including mapping the generated rule-set of non-overlapping rule to the obtained group of log records.

US Patent application No. US2018/0234457 published on Aug. 16, 2018 discloses a dynamic method for automated Security Information and Event Management (SIEM) custom correlation rule generation through the use of an interactive network visualization. The visualization is based on log data received from network endpoints and inputs received from a user, and is provided to the user for feedback before the SIEM custom correlation rules are automatically generated based on the visualization. The automatically generated SIEM custom correlation rules are then used to determine whether to trigger actions based on event data received from the network endpoints.

US Patent application No. US2016/0156664 published on Jun. 2, 2016 discloses a context-based security assurance service to enable secure application deployment. The service inspects network and cloud topologies to identify potential security capabilities and needs. Preferably, these options are then surfaced to the user with easy-to-understand, pre-configured templates representing security assurance levels. When a template (e.g., representing a pre-configured assurance level) is selected by the user, the system then applies specific capabilities and controls to translate the user-selected generalized specification (e.g., "high security") into granular requirements for a specific set of security resources. Preferably, the identification of these security resources is based on system configuration, administration, and information associated with the pre-configured template.

US Patent application No. US2014/0143878 published on May 22, 2014 discloses a gap analysis that is performed on security capabilities of a computer system compared to a desired or targeted security model according to one or more security requirement by providing a data structure of security capabilities of a computer system under analysis, wherein each capability is classified in a formal security capability reference model with a mean having a set of attributes and a goal; determining the security capabilities of the deployed system-under-analysis; matching the security capabilities of the deployed system-under-analysis with the security capabilities defined in the data structure; determining one or more gaps in security capabilities between the deployed system and a security reference model goal; and displaying the gaps to a user in a report.

GENERAL DESCRIPTION

In accordance with a first aspect of the presently disclosed subject matter, there is provided a system for identifying missing organizational security detection system rules, the system comprising at least one processing circuitry configured to: provide a known cyber-attack techniques repository including information of known cyber-attack techniques and required SIEM rules required for protecting against each of the known cyber-attack techniques, the known rules being in a generic SIEM rules format; obtain existing SIEM rules of a SIEM of an organization, the existing SIEM rules being in a vendor-specific language, other than the generic SIEM rules format; translate the existing SIEM rules to the generic SIEM rules format, using a translation system, giving rise to translated SIEM rules; compare the translated SIEM rules to the required SIEM rules to identify missing rules, being the required SIEM rules not included in the translated SIEM rules.

In some cases, the processing circuitry is further configured, upon identification of the missing rules, to: translate the missing rules to the vendor-specific language, giving rise to translated required rules; and add the translated required rules to the SIEM of the organization.

In some cases, the translation system is an encoder-decoder neural network.

In some cases, the encoder-decoder neural network is trained using a training set including the known rules and known translation of the known-rules to the vendor-specific language.

In some cases, the database is MITRE ATT&CK database.

In some cases, the comparison between the translated SIEM rules and the required SIEM rules is based on a similarity criterion.

In some cases, the organizational security detection system is a Security Information and Event Management (SIEM) system, an Endpoint Detection and Response (EDR) system or a firewall.

In accordance with a second aspect of the presently disclosed subject matter, there is provided a method for identifying missing organizational security detection system rules, the method comprising: providing, by a processing circuitry, a known cyber-attack techniques repository including information of known cyber-attack techniques and required SIEM rules required for protecting against each of the known cyber-attack techniques, the known rules being in a generic SIEM rules format; obtaining, by the processing circuitry, existing SIEM rules of a SIEM of an organization, the existing SIEM rules being in a vendor-specific language, other than the generic SIEM rules format; translating, by the processing circuitry, the existing SIEM rules to the generic SIEM rules format, using a translation system, giving rise to translated SIEM rules; comparing, by the processing circuitry, the translated SIEM rules to the required SIEM rules to identify missing rules, being the required SIEM rules not included in the translated SIEM rules.

In some cases, the processing circuitry is further configured, upon identification of the missing rules, to: translate the missing rules to the vendor-specific language, giving rise to translated required rules; and add the translated required rules to the SIEM of the organization.

In some cases, the translation system is an encoder-decoder neural network.

In some cases, the encoder-decoder neural network is trained using a training set including the known rules and known translation of the known-rules to the vendor-specific language.

In some cases, the database is MITRE ATT&CK database.

In some cases, the comparison between the translated SIEM rules and the required SIEM rules is based on a similarity criterion.

In some cases, the organizational security detection system is a Security Information and Event Management (SIEM) system, an Endpoint Detection and Response (EDR) system or a firewall.

In accordance with a third aspect of the presently disclosed subject matter, there is provided a non-transitory computer readable storage medium having computer readable program code embodied therewith, the computer readable program code, executable by a processing circuitry to perform a method for identifying missing organizational security detection system rules, the method comprising: providing, by a processing circuitry, a known cyber-attack techniques repository including information of known cyber-attack techniques and required SIEM rules required for protecting against each of the known cyber-attack techniques, the known rules being in a generic SIEM rules format; obtaining, by the processing circuitry, existing SIEM rules of a SIEM of an organization, the existing SIEM rules being in a vendor-specific language, other than the generic SIEM rules format; translating, by the processing circuitry, the existing SIEM rules to the generic SIEM rules format, using a translation system, giving rise to translated SIEM rules; comparing, by the processing circuitry, the translated SIEM rules to the required SIEM rules to identify missing rules, being the required SIEM rules not included in the translated SIEM rules.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
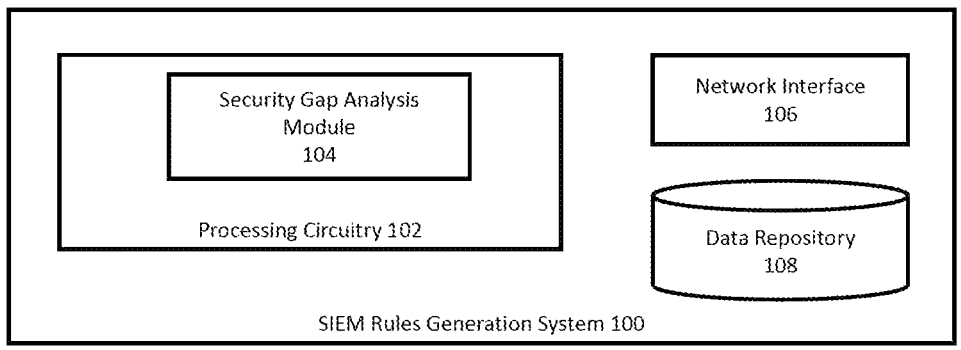
FIG. 1 is a block diagram schematically illustrating one example of a system for identifying missing security information and event management (SIEM) rules, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "providing". "obtaining", "translating", "comparing", "adding" or the like, include action and/or processes of a computer that manipulate and/or transform data into other data, said data represented as physical quantities, e.g. such as electronic quantities, and/or said data representing the physical objects. The terms "computer", "processor", "processing resource" and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case". "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
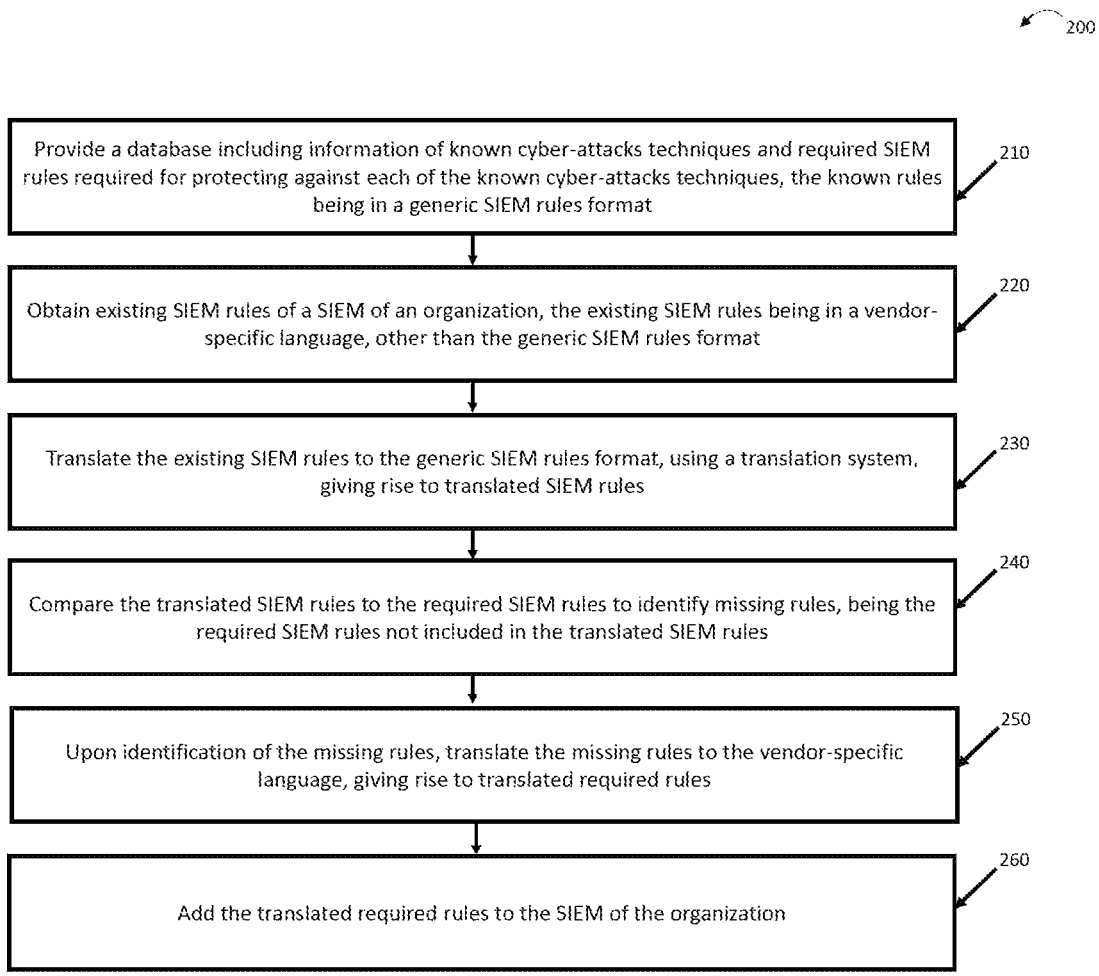
FIG. 2 is a flowchart illustrating one example of a sequence of operations carried out for identifying missing security information and event management (SIEM) rules, in accordance with the presently disclosed subject matter.
Figure 3:
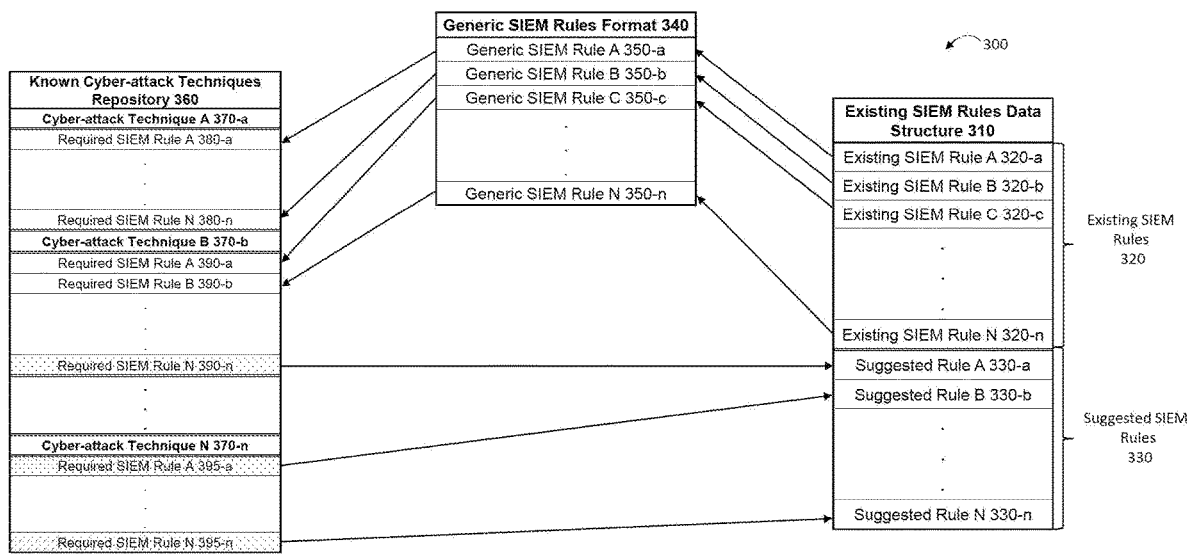
FIG. 3 is a block diagram schematically illustrating one example of an environment for identifying missing security information and event management (SIEM) rules, according to one example of the presently disclosed subject matter.

In embodiments of the presently disclosed subject matter, fewer, more and/or different stages than those shown in FIG. 2 may be executed. In embodiments of the presently disclosed subject matter one or more stages illustrated in FIG. 2 may be executed in a different order and/or one or more groups of stages may be executed simultaneously. FIGS. 1 and 3 illustrate a general schematic of the system architecture in accordance with an embodiment of the presently disclosed subject matter. Each module in FIGS. 1 and 3 can be made up of any combination of software, hardware and/or firmware that performs the functions as defined and explained herein. The modules in FIGS. 1 and 3 may be centralized in one location or dispersed over more than one location. In other embodiments of the presently disclosed subject matter, the system may comprise fewer, more, and/or different modules than those shown in FIGS. 1 and 3.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Before turning to FIG. 1, it is to be noted that although reference is made in the forgoing disclosure to security information and event management (SIEM) systems, it is by no means limiting and the teachings herein can be applied to any other rule-based organizational security detection system, including, for example, EDR, Firewalls, etc., mutatis mutandis.

Bearing this in mind, attention is drawn to FIG. 1, showing a block diagram schematically illustrating one example of a system 100 for identifying missing security information and event management (SIEM) rules, according to one example of the presently disclosed subject matter.

The system for identifying missing security information and event management (SIEM) rules 100 (also referred to herein as "system") includes a processing circuitry 102, a network interface 106 and a data repository 108.

The system 100 comprises at least one processing circuitry 102. Processing circuitry 102 can be one or more processing units (e.g. central processing units), microprocessors, microcontrollers or any other computing devices or modules, including multiple and/or parallel and/or distributed processing units, which are adapted to independently or cooperatively process data for controlling relevant resources of the system 100 and for enabling operations related to resources thereof.

The processing circuitry 102 comprises a security gap analysis module 104 configured to perform a process for identifying missing security information and event management (SIEM) (or any other organizational security detection system such as EDR, firewall, etc.) rules, as further detailed herein with respect to FIGS. 2 and 3.

According to certain examples of the presently disclosed subject matter, the system 100 can comprise a network interface 106 (e.g. a network interface card (NIC), a software implemented network interface, a Wi-Fi client, a Li-Fi, a 3G/4G client or any other component that enables the system 100 to connect a vendor-specific SIEM platform (or any other organizational security detection system such as EDR, firewall, etc.) and/or to an organizational communication network, such as but not limited to, a cellular network, a Personal Area Network (PAN) Local Area Network (LAN), a Wireless Local Area Network (WLAN), a Metropolitan Area Network (MAN), Wide Area Network (WAN), Virtual Private Network (VPN), an intranet, an extranet, an Internet, etc.).

In some cases, the system 100 may be comprised within a vendor-specific SIEM platform (or any other organizational security detection system such as EDR, firewall, etc.) or may otherwise communicate with it via wired or wireless communication, utilizing the network interface 106.

Turning to FIG. 2, there is shown a flowchart illustrating one example of a sequence of operations carried out for identifying missing security information and event management (SIEM) rules, in accordance with the presently disclosed subject matter.

According to certain examples of the presently disclosed subject matter, system 100 can be configured to perform a security gap analysis process 200, e.g. utilizing a security gap analysis module 104.

For this purpose, the system 100 can be configured to provide a database including information of known cyber-attacks techniques and required SIEM (or any other organizational security detection system such as EDR, firewall, etc.) rules required for protecting against each of the known cyber-attacks techniques, wherein the known rules being in a generic SIEM (or any other organizational security detection system such as EDR, firewall, etc.) rules format (block 210).

Further to described herein above with respect to FIG. 1, the system 100 may comprise database that includes information of known cyber-attacks techniques. For example, the database may be a MITRE ATT&CK database. In addition, thousands of generic SIEM (or any other organizational security detection system such as EDR, firewall, etc.) rules that are associated with each of the known cyber-attack techniques can be provided by system 100, for example, in generic and open signature format—Sigma.

The system 100 can be further configured to obtain existing SIEM (or any other organizational security detection system such as EDR, firewall, etc.) rules of a SIEM (or any other organizational security detection system such as EDR, firewall, etc.) of an organization, the existing SIEM (or any other organizational security detection system such as EDR, firewall, etc.) rules being in a vendor-specific language, other than the generic SIEM (or any other organizational security detection system such as EDR, firewall, etc.) rules format (block 220).

Various organizations may use different SIEM (or any other organizational security detection system such as EDR, firewall, etc.) rule formats. i.e. SIEM (or any other organizational security detection system such as EDR, firewall, etc.) rules of a vendor-specific language (e.g. RSA NetWitness, IBM QRadar, Splunk Enterprise Security, etc.). It is to be noted that these SIEM (or any other organizational security detection system such as EDR, firewall, etc.) rules differ from the generic SIEM (or any other organizational security detection system such as EDR, firewall, etc.) rules.

Attention is now drawn to FIG. 3, which depicts various SIEM correlation rules grouped by different SIEM platforms and interrelations thereof.

Existing SIEM rules data structure 310 represents existing SIEM correlation rules of a SIEM platform of an organization. The existing SIEM rules data structure 310 includes existing SIEM Rules 320. The existing SIEM rules 320 are in fact SIEM correlation rules in a Vendor-specific Language, e.g. LogRhythm Security Intelligence Platform, AlienVault Unified Security Management, etc., as described herein above.

Turning to FIG. 2, the system 100 can be further configured to translate the existing SIEM rules to the generic SIEM rules format, using a translation system, giving rise to translated SIEM rules (block 230).

In accordance with the presently disclosed subject matter and with reference to FIG. 3, existing SIEM Rules 320 may be translated to a Generic SIEM Rules Format 340. That is, each existing SIEM Rule 320 may be translated to a corresponding SIEM rule in a generic format 340. For example, existing SIEM rule A 320-*a* may be translated to a corresponding generic SIEM rule A 350-*a*, existing SIEM rule B 320-*b* may be translated to a corresponding generic SIEM rule B 350-*b* and so on. Generic SIEM rules format 340 may be a generic and open signature format such as Sigma known in the art. For translation purposes, various repositories of Sigma rules (e.g. SOC Prime) may be utilized.

In some cases, the translation system is an encoder-decoder neural network. The encoder-decoder neural network may be trained using a training set including the known rules and known translation of the known-rules to the vendor-specific language. For this purpose, various models may be utilized, i.e. Sequence-to-sequence learning (Seq2Seq) model. The training set may include thousands (or more) of generic Sigma rules and conversions thereof to vendor-specific language rules as an input to the encoder-decoder neural network. Further, a training model (i.e. Arcsight2Sigma, Qradar2Sigma, or the like) may be utilized in order to translate the vendor-specific language rules to the generic Sigma rules format. That is, each existing SIEM correlation rule (in a vendor-specific language), that is comprised within the SIEM platform of the organization, can be translated to a generic SIEM rule format.

According to FIG. 2, system 100 can be further configured to compare the translated SIEM (or any other organizational security detection system such as EDR, firewall, etc.) rules to the required SIEM (or any other organizational security detection system such as EDR, firewall, etc.) rules to identify missing rules, being the required SIEM (or any other organizational security detection system such as EDR, firewall, etc.) rules not included in the translated SIEM (or any other organizational security detection system such as EDR, firewall, etc.) rules (block 240).

The system 100 can utilize a known Cyber-attack Techniques repository (e.g. MITRE ATT&CK™ matrix) in order to compare between the translated SIEM rules and the required SIEM rules that are mapped to specific Cyber-attack Techniques, in order to identify missing SIEM rules. That is, each Cyber-attack Technique may be associated with at least one generic SIEM rule. The at least one generic SIEM rule is required for a SIEM platform in order to cover the specific Cyber-attack Technique that associated therewith. In the event that all the translated SIEM rules have corresponding generic SIEM rules, the generic SIEM rules that do not have corresponding translated SIEM rules can be identified as missing rules by system 100.

Attention is now drawn to FIG. 3, that exemplifies the comparison between the translated SIEM rules and the required SIEM rules. Once the existing SIEM Rules 320 have been translated to generic SIEM Rules format 340, next they can be matched to corresponding required SIEM rules that are mapped, utilizing a known Cyber-attack Techniques repository 360 (e.g. MITRE ATT&CK™ matrix known in the art), to respective Cyber-attack Techniques.

Cyber-attack Techniques repository 360 can incorporate required SIEM Rules, wherein each required SIEM rule is mapped to a specific Cyber-attack Technique. That is, each Cyber-attack Technique may comprise at least one required SIEM Rule associated therewith. For example, required SIEM Rule A 380-*a*, ..., required SIEM Rule N 380-*n* are mapped to a Cyber-attack Technique A 370-*a* while required SIEM rule A 390-*a*, ..., required SIEM rule N 390-*n* are mapped to a Cyber-attack Technique B 370-*b*.

This way, each generic SIEM rule 350 can be matched to a corresponding required SIEM rule listed in Cyber-attack Techniques repository 360, that is mapped to a specific Cyber-attack Technique.

It is to be noted that, in some cases, one generic SIEM rule 350 can be matched to merely one corresponding required SIEM rule listed in repository 360 that is mapped to a specific Cyber-attack Technique. In other cases, one generic SIEM rule 350 can be matched to one or more corresponding required SIEM rules listed in repository 360, that may be mapped to one or more specific Cyber-attack Techniques.

For example, generic rule N 350-*n* can be matched to required SIEM rule B 390-*b*, that is mapped to cyber-attack Technique B 370-*b*, and to required SIEM rule B 395-*b* (not shown), that is mapped to Cyber-attack Technique N 370-*n*.

In some cases, required SIEM rules listed in the Known Cyber-attack Techniques repository 360 that do not have a matched generic SIEM rule 350, from the generic SIEM rules format 340, may be indicated as missing rules in the existing SIEM rules data structure 310, i.e. these SIEM correlation rules may be indicated as missing in the SIEM platform of the organization.

For example, required SIEM rule N 390-*n*, mapped to Cyber-attack Technique B 370-*b*, does not have a matched generic SIEM rule 350 from the generic SIEM rules format 340. Therefore, required SIEM rule N 390-*n* may be indicated as a missing rule in the existing SIEM rules data structure 310, i.e. it may be indicated as missing in the SIEM platform of the vendor.

In some cases, if at least one required SIEM Rule, that is mapped to a specific Cyber-attack Technique, in the Known Cyber-attack Techniques 360 repository, has a matched generic SIEM rule 350, then the specific Cyber-attack Technique will be indicated as covered by the SIEM platform of the organization. For example, if a required SIEM rule C 390-*c* (not shown), that is mapped to Cyber-attack Technique B 370-*b*, has a matching generic SIEM rule D 350-*d* (not shown) then all other required SIEM rules that are mapped to the same Cyber-attack Technique B 370-*b* will not be indicated as missing in the SIEM platform of the organization, although they may not be listed in the existing SIEM rules data structure 310.

In other cases, if at least one required SIEM Rule, that is mapped to a specific Cyber-attack Technique, in the Known Cyber-attack Techniques 360 repository, does not have a matched generic SIEM rule 350, then the specific Cyber-attack Technique will be indicated as not covered by the SIEM platform of the organization and the at least one required SIEM Rule will be indicated as missing in the SIEM platform of the organization.

Alternatively, or additionally, the comparison between the translated SIEM rules and the required SIEM rules is based on a similarity criterion. In these cases, the translated SIEM rule can be compared to the required SIEM rule that is resembling thereof but not identical to the required SIEM rule. Namely, it can be compared to the required SIEM rule that is substantially the same.

In some cases, with reference to FIG. 1, the system 100 comprises, or may be otherwise associated with, a data repository 108 (e.g. a database, a storage system, a memory including Read Only Memory—ROM, Random Access Memory—RAM, magnetic disk storage media, optical storage media, flash memory devices, or any other type of memory) configured to store data, including inter alia data relating to the SIEM (or any other organizational security detection system such as EDR, firewall, etc.) correlation rules of the SIEM (or any other organizational security detection system such as EDR, firewall, etc.) platform of the organization, generic SIEM (or any other organizational security detection system such as EDR, firewall, etc.) rules format repository 140, known cyber-attack techniques repository 360, various configurations of the SIEM platform (or any other organizational security detection system such as EDR, firewall, etc.) of the organization. SIEM platform (or any other organizational security detection system such as EDR, firewall, etc.) ingestion sources (e.g. IDS/IPS, DLP, Firewalls, UTM, web filters, etc.) or any other relevant information on applications running in an organization.

In some cases, data repository 108 can be further configured to enable retrieval and/or update and/or deletion of the stored data. It is to be noted that in some cases, data repository 108 can be distributed across multiple locations, whether within the system 100 and/or elsewhere. It is to be noted, that in some cases, the relevant information relating to the SIEM (or any other organizational security detection system such as EDR, firewall, etc.) correlation rules of the SIEM platform (or any other organizational security detection system such as EDR, firewall, etc.) of the organization can be loaded into data repository 108 before connecting the system 100 to the SIEM platform (or any other organizational security detection system such as EDR, firewall, etc.) of the organization and/or periodically and/or upon the system 100 requesting the information or after.

According to FIG. 2, upon identification of the missing rules, the system 100 can be further configured to translate the missing rules to the vendor-specific language, giving rise to translated required rules (block 250).

For this purpose, the system 100 can utilize the encoder-decoder neural network to translate the desired missing rules to the vendor-specific language, as described hereinabove.

The system 100 can be further configured to add the translated required rules to the SIEM (or any other organizational security detection system such as EDR, firewall, etc.) of the organization (block 260).

The missing vendor-specific language SIEM (or any other organizational security detection system such as EDR, firewall, etc.) rules, that are required for the SIEM platform (or any other organizational security detection system such as EDR, firewall, etc.) of the organization, can be added to SIEM platform (or any other organizational security detection system such as EDR, firewall, etc.) of the organization by system 100. This way, Cyber-attack Techniques that initially were not covered by SIEM platform (or any other organizational security detection system such as EDR, firewall, etc.) of the organization can be monitored and analyzed by system 100.

Attention is now drawn back to FIG. 3. The missing required SIEM rules that are mapped under Known Cyber-attack Techniques 360 can be translated (e.g. using Sigma) to vendor-specific language SIEM rules and suggested to be added to the SIEM platform of the organization. For example, required SIEM Rule N 390-*n*, mapped to Cyber-attack Technique B 370-*b*, can be translated to a suggested rule A 330-*a* in the existing SIEM rules data structure 310. Required SIEM rule A 395-*a*, mapped to Cyber-attack Technique N 370-*n*, can be translated to a suggested rule B 330-*b* in the existing SIEM rules data structure 310, and so on.

It is to be noted that, in some cases, one required SIEM rule, mapped to a specific Cyber-attack Technique, can be translated to merely one suggested SIEM rule in the existing SIEM rules data structure 310.

Such framework combines the capabilities of analyzing existing SIEM platform of the organization in terms of which Cyber-attack Techniques are covered by the platform and suggesting missing SIEM rules for Cyber-attack Techniques that are not covered and/or partially covered by the platform and thereby compensating for security gaps therein.

It is to be noted that, with reference to FIG. 2, some of the blocks can be integrated into a consolidated block or can be broken down to a few blocks and/or other blocks may be added. Furthermore, in some cases, the blocks can be performed in a different order than described herein (for example, block 240 can be performed before block 230, block 230 can be performed before block 220, block 220 can be performed before block 210, etc.). It is to be further noted that some of the blocks are optional. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A system for identifying missing organizational security detection system rules, the system comprising at least one processing circuitry configured to:
provide a known cyber-attack techniques repository including information of known cyber-attack techniques and required Security Information and Event Management (SIEM) rules required for protecting against each of the known cyber-attack techniques, the known rules being in a generic SIEM rules format;
obtain existing SIEM rules of a SIEM of an organization, the existing SIEM rules being in a vendor-specific language, other than the generic SIEM rules format;
translate the existing SIEM rules to the generic SIEM rules format, using a translation system, giving rise to translated SIEM rules;
compare the translated SIEM rules to the required SIEM rules to identify missing rules, being the required SIEM rules not included in the translated SIEM rules;
translate the missing rules to the vendor-specific language, giving rise to translated required rules; and
add the translated required rules to the SIEM of the organization.

2. The system of claim 1, wherein the translation system is an encoder-decoder neural network.

3. The system of claim 2, wherein the encoder-decoder neural network is trained using a training set including the known rules and known translation of the known-rules to the vendor-specific language.

4. The system of claim 1, wherein the database is MITRE ATT&CK database.

5. The system of claim 1, wherein the comparison between the translated SIEM rules and the required SIEM rules is based on a similarity criterion.

6. The system of claim 1, wherein the organizational security detection system is a Security Information and Event Management (SIEM) system, an Endpoint Detection and Response (EDR) system or a firewall.

7. A method for identifying missing organizational security detection system rules, the method comprising:
providing, by a processing circuitry, a known cyber-attack techniques repository including information of known cyber-attack techniques and required Security Information and Event Management (SIEM) rules required for protecting against each of the known cyber-attack techniques, the known rules being in a generic SIEM rules format;
obtaining, by the processing circuitry, existing SIEM rules of a SIEM of an organization, the existing SIEM rules being in a vendor-specific language, other than the generic SIEM rules format;
translating, by the processing circuitry, the existing SIEM rules to the generic SIEM rules format, using a translation system, giving rise to translated SIEM rules;
comparing, by the processing circuitry, the translated SIEM rules to the required SIEM rules to identify missing rules, being the required SIEM rules not included in the translated SIEM rules;
translating the missing rules to the vendor-specific language, giving rise to translated required rules; and
adding the translated required rules to the SIEM of the organization.

8. The method of claim 7, wherein the translation system is an encoder-decoder neural network.

9. The method of claim 8, wherein the encoder-decoder neural network is trained using a training set including the known rules and known translation of the known-rules to the vendor-specific language.

10. The method of claim 7, wherein the database is MITRE ATT&CK database.

11. The method of claim 7, wherein the comparison between the translated SIEM rules and the required SIEM rules is based on a similarity criterion.

12. The method of claim 7, wherein the organizational security detection system is a SIEM system, an Endpoint Detection and Response (EDR) system or a firewall.

13. A non-transitory computer readable storage medium having computer readable program code embodied therewith, the computer readable program code, executable by a processing circuitry to perform a method for identifying missing organizational security detection system rules, the method comprising:
providing, by a processing circuitry, a known cyber-attack techniques repository including information of known cyber-attack techniques and required Security Information and Event Management (SIEM) rules required for protecting against each of the known cyber-attack techniques, the known rules being in a generic SIEM rules format;
obtaining, by the processing circuitry, existing SIEM rules of a SIEM of an organization, the existing SIEM rules being in a vendor-specific language, other than the generic SIEM rules format;
translating, by the processing circuitry, the existing SIEM rules to the generic SIEM rules format, using a translation system, giving rise to translated SIEM rules;
comparing, by the processing circuitry, the translated SIEM rules to the required SIEM rules to identify missing rules, being the required SIEM rules not included in the translated SIEM rules;
translating the missing rules to the vendor-specific language, giving rise to translated required rules; and
adding the translated required rules to the SIEM of the organization.

* * * * *